(12) United States Patent
Avritzer

(10) Patent No.: US 8,832,839 B2
(45) Date of Patent: Sep. 9, 2014

(54) ASSESSING SYSTEM PERFORMANCE IMPACT OF SECURITY ATTACKS

(75) Inventor: Alberto Avritzer, Mountainside, NJ (US)

(73) Assignee: Siemens Aktiengesellschaft, Munich (DE)

( * ) Notice: Subject to any disclaimer, the term of this patent is extended or adjusted under 35 U.S.C. 154(b) by 202 days.

(21) Appl. No.: 13/178,581

(22) Filed: Jul. 8, 2011

(65) Prior Publication Data

US 2012/0174231 A1    Jul. 5, 2012

Related U.S. Application Data

(60) Provisional application No. 61/429,518, filed on Jan. 4, 2011.

(51) Int. Cl.
| | | |
|---|---|---|
| *G06F 11/00* | (2006.01) | |
| *G06F 12/14* | (2006.01) | |
| *G06F 12/16* | (2006.01) | |
| *G08B 23/00* | (2006.01) | |
| *G06F 21/00* | (2013.01) | |
| *G06F 11/34* | (2006.01) | |

(52) U.S. Cl.
CPC ............ *G06F 11/00* (2013.01); *G06F 2201/81* (2013.01); *G06F 21/00* (2013.01); *G06F 11/3409* (2013.01)
USPC .............................................. 726/25; 726/22

(58) Field of Classification Search
USPC ........................................................ 726/1–25
See application file for complete search history.

(56) References Cited

U.S. PATENT DOCUMENTS

| | | | |
|---|---|---|---|
| 7,013,395 B1 * | 3/2006 | Swiler et al. ................... 726/25 |
| 7,203,622 B2 * | 4/2007 | Pan et al. ...................... 702/184 |
| 7,219,049 B2 * | 5/2007 | Prowell .......................... 703/22 |
| 7,266,484 B2 | 9/2007 | Lombardo et al. |
| 7,284,274 B1 | 10/2007 | Walls et al. |
| 7,792,779 B2 * | 9/2010 | Dash .............................. 706/52 |
| 7,818,797 B1 * | 10/2010 | Fan et al. ........................ 726/22 |
| 7,992,192 B2 * | 8/2011 | Maher et al. ...................... 726/3 |
| 8,079,080 B2 * | 12/2011 | Borders .......................... 726/22 |
| 8,108,929 B2 * | 1/2012 | Agrawal et al. ................. 726/23 |
| 8,135,661 B2 * | 3/2012 | Olsson ........................... 706/56 |
| 2003/0014735 A1 * | 1/2003 | Achlioptas et al. ........... 717/125 |

(Continued)

OTHER PUBLICATIONS

Dacier, Marc, Yves Deswarte, and Mohamed Kaâniche. "Quantitative assessment of operational security: Models and tools." Information Systems Security, ed. By SK Katsikas and D. Gritzalis, London, Chapman & Hall (1996): 179-86. [retrieved from Citeseer database on Dec. 16, 2012 ].*

(Continued)

*Primary Examiner* — Tae Kim

(57) ABSTRACT

A method for assessing an impact of a security attack on a system includes defining a system affecting metric for an observation period as a fraction of time the system satisfies a defined specification, defining a resource failure based model and a resource usage based model for the system, obtaining results for each of a plurality of states of the resource failure based model and the resource usage based model, solving the resource failure based model and the resource usage based model and obtaining a term fraction of time each model spends on each of the plurality of states, obtaining a state probability according to the term fraction, and obtaining a measure of the system affecting metric according to the state probability.

17 Claims, 4 Drawing Sheets

(56) References Cited

U.S. PATENT DOCUMENTS

| | | | |
|---|---|---|---|
| 2005/0060357 A1* | 3/2005 | Prowell | 708/200 |
| 2006/0253839 A1* | 11/2006 | Avritzer et al. | 717/124 |
| 2007/0240207 A1* | 10/2007 | Belakhdar et al. | 726/12 |
| 2009/0044256 A1* | 2/2009 | Moyle et al. | 726/4 |
| 2009/0094669 A1* | 4/2009 | Savadi et al. | 726/1 |
| 2009/0144827 A1* | 6/2009 | Peinado et al. | 726/25 |
| 2011/0185422 A1* | 7/2011 | Khayam et al. | 726/23 |
| 2011/0208681 A1* | 8/2011 | Kuecuekyan | 706/21 |
| 2012/0078823 A1* | 3/2012 | Suyama et al. | 706/12 |
| 2012/0137367 A1* | 5/2012 | Dupont et al. | 726/25 |
| 2013/0111588 A1* | 5/2013 | Agrawal et al. | 726/23 |

OTHER PUBLICATIONS

Kim, Dong Seong, Khaja Mohammad Shazzad, and Jong Sou Park. "A framework of survivability model for wireless sensor network." in Availability, Reliability and Security, 2006. ARES 2006. The First International Conference on, pp. 8-pp. IEEE, 2006. [retrieved from IEEE database on Dec. 16, 2012].*

Ortalo, Rodolphe, Yves Deswarte, and Mohamed Kaâniche. "Experimenting with quantitative evaluation tools for monitoring operational security." Software Engineering, IEEE Transactions on 25, No. 5 (1999): 633-650. [retrieved from IEEE database on Dec. 16, 2012].*

Vijayaraghavan, V., and Sanjoy Paul. "iMeasure security (iMS): A novel framework for security quantification." In Networks and Communications, 2009. NETCOM'09. First International Conference on, pp. 414-421. IEEE, 2009. [retrieved from IEEE database on Dec. 16, 2012].*

Pimentel, Andy D., L. O. Hertzbetger, Paul Lieverse, Pieter van der Wolf, and E. E. Deprettere. "Exploring embedded-systems architectures with Artemis." Computer 34, No. 11 (2001): 57-63. [retrieved from IEEE database on Dec. 16, 2012].*

Lili, Shi, Yang Shoubao, Guo Liangmin, and Wu Bin. "A Markov chain based resource prediction in computational grid." in Frontier of Computer Science and Technology, 2009. FCST'09. Fourth International Conference on, pp. 119-124. IEEE, 2009. [retreved from IEEE database on Dec. 16, 2012].*

Lings et al., "A Reference Model for Successful Distributed Development of Software Systems," Proc. Second IEEE International Conference on Global Software Engineering, Munich, Germany, Aug. 2007, 130-139.

Houmb et al, "Estimating Impact and Frequency of Risks to Safety and Mission Critical Systems Using CVSS," WDSE 2008, Seattle, Nov. 2008.

* cited by examiner

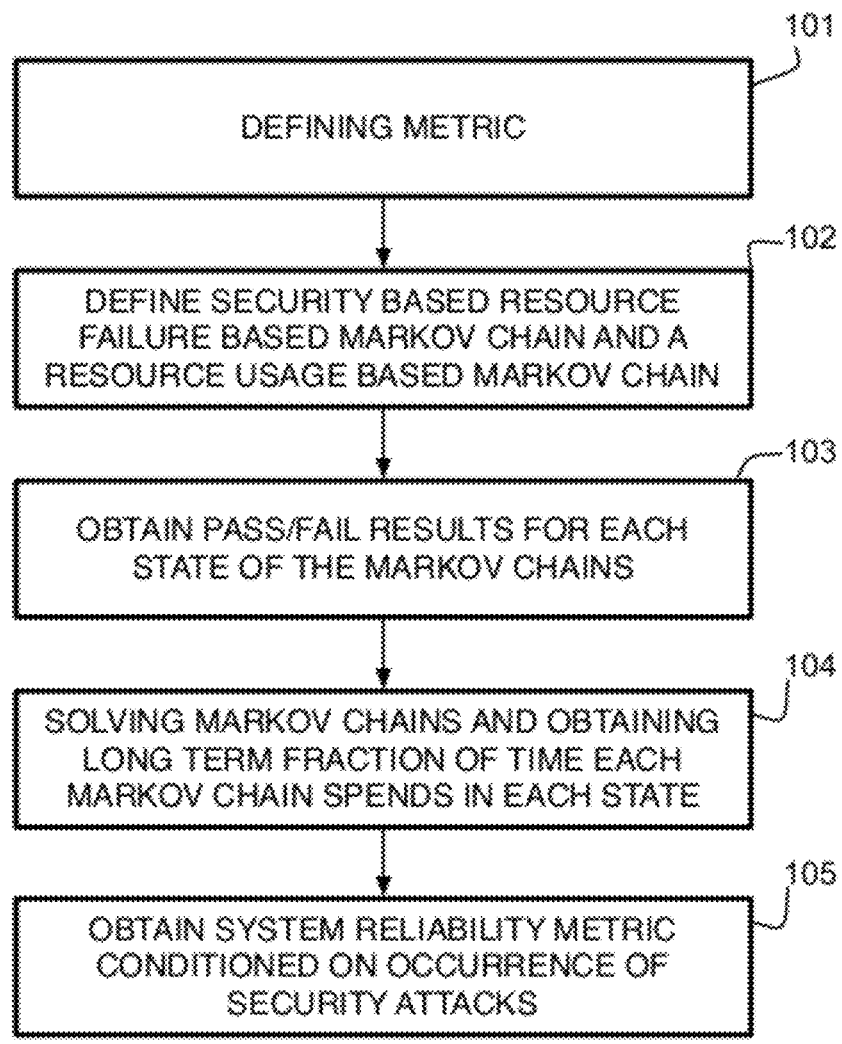

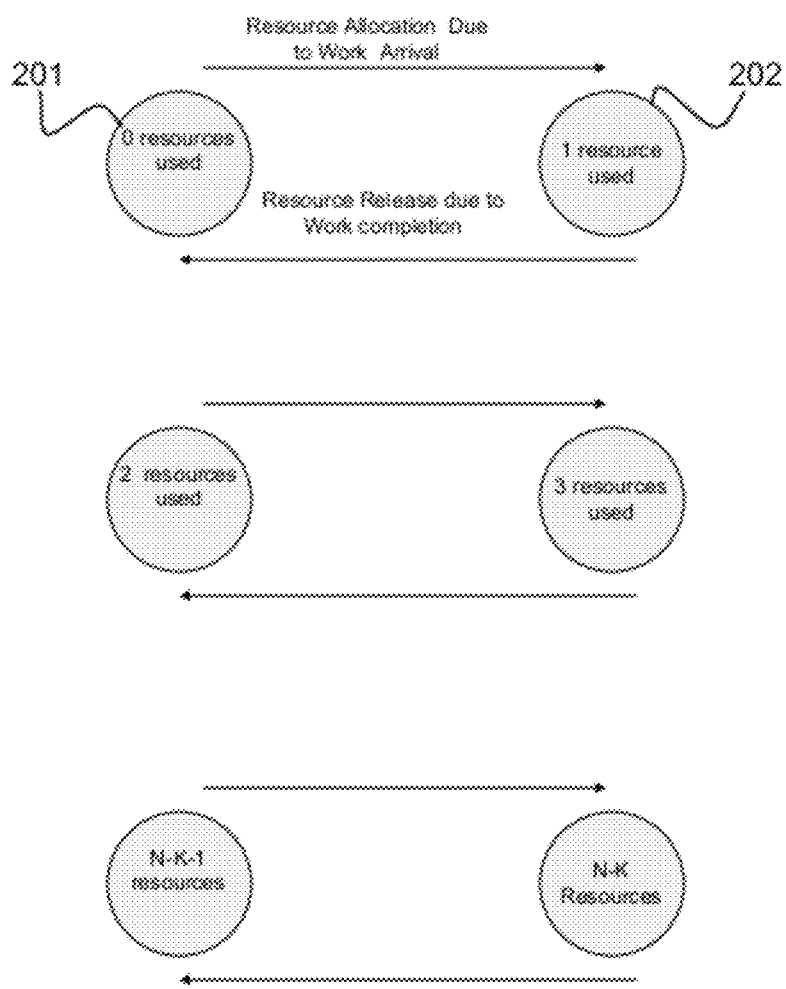

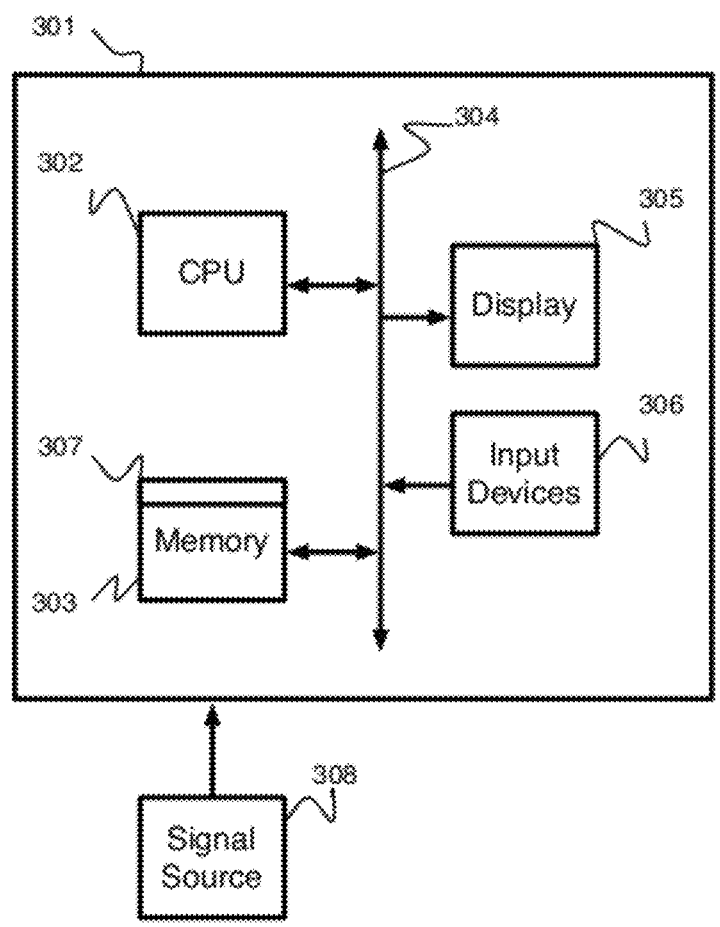

ASSESSING SYSTEM PERFORMANCE IMPACT OF SECURITY ATTACKS

CROSS-REFERENCE TO RELATED APPLICATION

This application claims the benefit of Provisional Application No. 61/429,518 filed on Jan. 4, 2011 in the United States Patent and Trademark Office, the contents of which are herein incorporated by reference in its entirety.

BACKGROUND

1. Technical Field

The present disclosure relates to methods for assessing system performed, and more particularly to assessing system performance during a security attack.

2. Discussion of Related Art

Deterministic State Testing (DST) is a load test generation and execution approach for the generation and execution of performance tests. DST uses a high level state definition, and an analytical approximation to identify most likely states in continuous-time Markov chain representation of a system under test. The most likely states represent states to be exercised by performance tests because these states contain the problems that are most likely to be encountered in production. The current mode of operation of DST is based on ranking by usage and by failures related to security vulnerabilities.

SUMMARY

According to an embodiment of the present disclosure, a method for assessing an impact of a security attack on a system includes defining a system affecting metric for an observation period as a fraction of time the system satisfies a defined specification, defining a resource failure based model and a resource usage based model for the system, obtaining results for each of a plurality of states of the resource failure based model and the resource usage based model, solving the resource failure based model and the resource usage based model and obtaining a term fraction of time each model spends on each of the plurality of states, obtaining a state probability according to the term fraction, and obtaining a measure of the system affecting metric according to the state probability.

According to an embodiment of the present disclosure, a method for assessing an impact of a security attack on a system is embodied as a non-transitory computer readable medium storing instructions executable by a processor.

According to an embodiment of the present disclosure, a system for assessing an impact of a security attack includes a processor configured to obtain a measure of a system affecting metric for an observation period as a fraction of time the system satisfies a defined specification according to a state probability by defining a resource failure based Markov chain and a resource usage based Markov chain for the system, obtaining results for each of a plurality of states of the resource failure based Markov chain and the resource usage based Markov chain, solving the resource failure based Markov chain and the resource usage based Markov chain and obtaining a term fraction of time each Markov chain spends on each state, obtaining a Markov state probability; and obtaining a measure of the system affecting metric according to the state probability, and a memory configured to store the measure of a system affecting metric.

BRIEF DESCRIPTION OF THE DRAWINGS

Preferred embodiments of the present disclosure will be described below in more detail, with reference to the accompanying drawings:

FIG. 1 is a flow diagram of a method according to an embodiment of the present disclosure;

FIG. 2A is resource usage Markov chain according to an embodiment of the present disclosure;

FIG. 3 is a diagram of a computer system for automatic measurement of morphometric and motion parameters according to an embodiment of the present disclosure.

DETAILED DESCRIPTION OF EXEMPLARY EMBODIMENTS

Figure 2B:
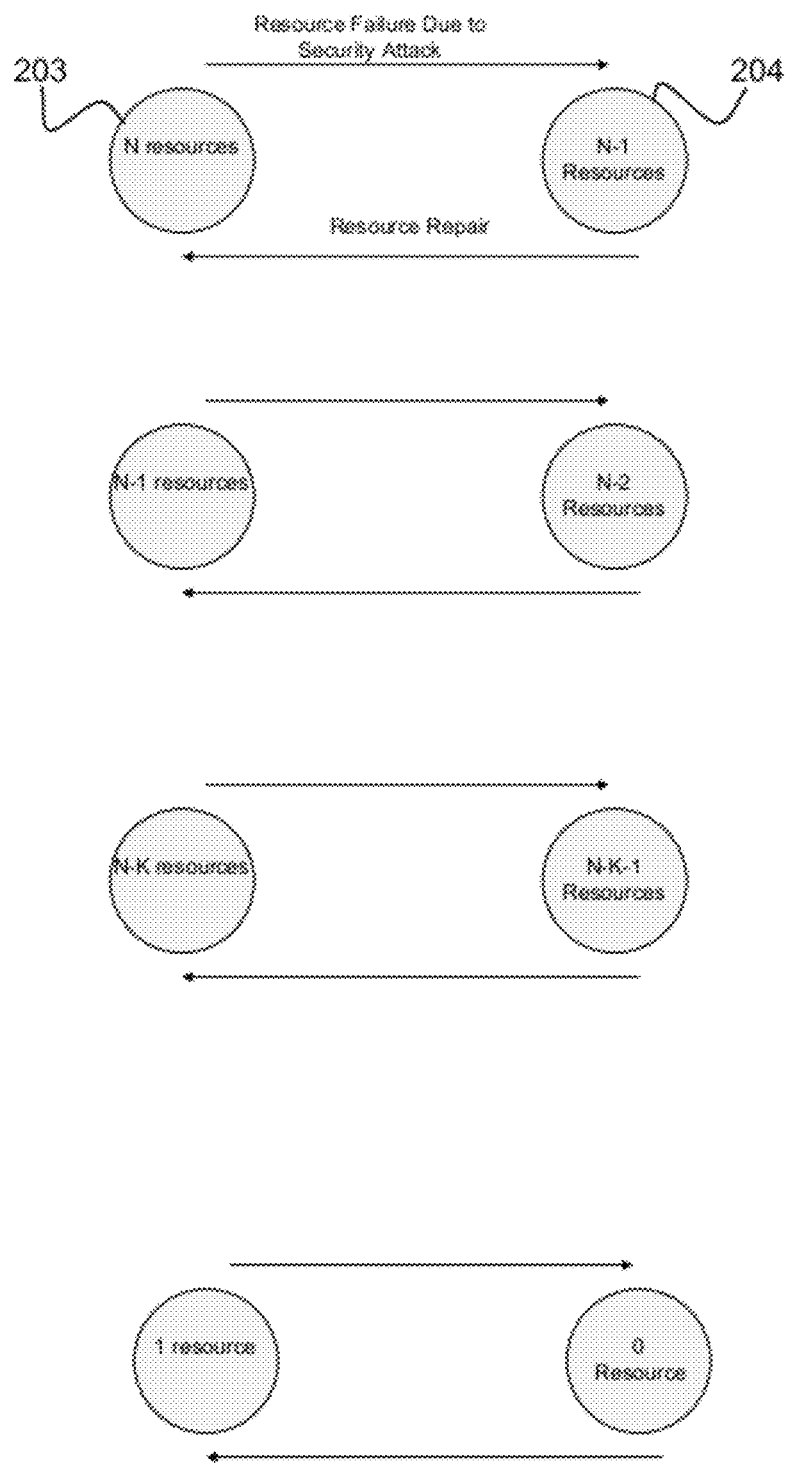
FIG. 2B is resource failure Markov chain according to an embodiment of the present disclosure.

According to an embodiment of the present disclosure, an impact of security attacks on a system performance may be assessed to reveal information about system performance survivability. More particularly, the assessment is a stochastic assessment of the likelihood of performance attacks and the impact of security attacks on system performance. An exemplary method may be applied at a back end of a software development process.

The security attacks may include, for example, denial of service (DoS) attacks, buffer overflow attacks, access control discovery attacks and other types of security attacks that impact system performance. In the case of a DoS attacks computational resources are consumed, disrupting configuration information, state information and physical network components, and obstructing the communication media. Different attacks may affect system performance differently.

According to an embodiment of the present disclosure, a method for assessing an impact of security attacks on a system includes building a resource failure based model and a resource usage based model. Markov chains may be used as the model to evaluate system reliability, e.g., a probability of successful operation when the system is subjected to security attacks. Likely security attacks are simulated and an assessment is made of the performance during the security attacks.

According to an embodiment of the present disclosure, a security test suite is created and applied to a system under test. At this time, system performance is measured and Markov modeling may be used to assess a security testing metric.

The security test suite may include a set of likely attacks. More particularly, the security test suite includes tests cases derived from known types of security attacks.

An exemplary method may be used to stochastically determine a conditional reliability of a system under test using test case results. More particularly, the security testing metric may capture an indication of a time that the system is operating correctly (e.g., within a defined performance/reliability specification). The system performance metric may be determined by solving a failure based Markov chain and a resource usage based Markov chain and incorporating the results of the security test suite into the system performance metric.

According to an embodiment of the present disclosure, a method for assessing an impact of security attacks on a system (FIG. 1) includes defining a system performance/reliability affecting metric for a given observation period as a fraction of time the system satisfies a defined performance/reliability specification 101 and defining a security based resource failure based Markov chain and a resource usage based Markov chain for the system under test 102. Exemplary component measurements in the specification include processor usage (e.g., percentage of total), processor interrupt rate, interrupt handling time, TCP (Transmission Control Protocol) throughput, system availability, average queue length (e.g., in the case of applications such as email), etc.

The system under test can take a variety of different system resource configurations. Several Markov resource usage based Markov chains may be generated, wherein one Markov chain may be associated with each resource configuration. System resource configurations may vary because of resource failures and/or security attacks.

The method may further include using security test case results to obtain the pass/fail results for each state of the resource failure based Markov chain and the resource usage based Markov chain 103, wherein the pass/fail results convey the impact of the failure on the customers and solving the Markov chains using known techniques and obtain long term fraction of time each Markov chain spends on each state 104.

The stochastic nature of security attacks may be obtained by conditioning each Markov chain on the occurrence of the given security attack. The Markov state probability may be obtained using numerical solution techniques, such as Uniformization.

Uniformization is a known method for determining transient solutions of continuous-time Markov chains, e.g., involving the transformation of a continuous time Markov chain to an analogous discrete time Markov chain.

At block 105, the system reliability metric conditioned on the occurrence of the known security attacks may be obtained by summing-up the states for each of the system performance requirements met using the pass/fail criteria obtained from the system under test. That is, according to an exemplary approach, results from a transient Markov chain analysis may be used to estimate reliability at a given system execution time.

More particularly, at block 105, the system under test may be modeled as a resource failure based Markov chain X for system reliability. This Markov chain may lead to C possible distinct configurations and C different resource usage-based Markov chains Y(i) for configuration $c_i$. The resource usage based Markov chains may be solved to obtain a long-term fraction of time in each state of the individual chains, where $y_j(i)$ is obtained, the fraction of time during (0, t) that Y(i) spends in state $s_j(i)$. The resource failure-based Markov chain is solved to obtain the fraction of time during (0, t) that X spends in each state $\phi_i$. For the resource failure based Markov chain generate as a test suite the list of states from X such that the sum of the total fraction of time in these states is above a given threshold value, in order to cover an appropriate number of cases during the observation interval, e.g., a threshold value maximizing the number of cases. It should be understood that other system reliability metrics may be used.

FIGS. 2A and 2B are exemplary resource usage and failure based Markov chains, respectively. The Markov chains codify changes in transitions from one state to another; according to an exemplary embodiment of the present disclosure, states may be modeled as the number of resources N used or available.

FIG. 2A is an exemplary resource usage Markov chain for a given resource configuration with N-K total number of resources. In FIG. 2A, rightward pointing arrows correspond to resource allocation due to work arrival, e.g., escalating from 0 resources used 201 to 1 resource used 202. Leftward pointing arrows correspond to resource release due to work completion, e.g., decrementing from 1 resource to 0 resource.

FIG. 2B is an exemplary resource failure Markov chain producing C different resource configurations. In FIG. 2B, rightward pointing arrows correspond to resource failure due to a security attack, e.g., decrementing from N resources 203 to N−1 resources 204. Leftward pointing arrows correspond to resource repair, e.g., making resources available after repair.

According to an embodiment of the present disclosure, the system reliability assessments may be conditioned on the occurrence of security attacks. Performance of the system reliability metric may be measured as accuracy and/or efficiency, for example, as compared to observed real-world data.

Referring to accuracy, pass/fail criteria may be determined for each state of the resource usage Markov chain for each defined failure configuration. Data related to the known security attacks is collected periodically (e.g., attack trees and attack patterns or profiles). The system reliability metric conditioned on security attacks is evaluated each time a new system or a modified system goes through a performance testing phase.

Referring to efficiency, the derivation of a security test suite based on known security attacks allows the security manager to focus on a significantly shorter list of attacks as compared to the full list of vulnerabilities published at the standard security web sites. When new attack types become popular, the security test suite needs to be updated to account for the impact of these new attacks on system performance.

Exemplary methods may be generalized to automatically change the network, system and software configuration to increase the available capacity of the system under test, when the system reliability metric conditioned on security attacks e.g., the probability of not meeting performance requirements when the system is under a certain security attack, crosses a pre-defined threshold. Here, exemplary methods may be executed in real-time on a live production system to detect a performance impacting security attack and to initiate countermeasures.

It is to be understood that embodiments of the present disclosure may be implemented in various forms of hardware, software, firmware, special purpose processors, or a combination thereof. In one embodiment, a method for low complexity signal analysis may be implemented in software as an application program tangibly embodied on a computer readable medium. The application program may be uploaded to, and executed by, a processor comprising any suitable architecture.

Referring to FIG. 3, according to an embodiment of the present disclosure, a computer system 301 for implementing a method for assessing an impact of security attacks on a system performance can comprise, inter alia, a central processing unit (CPU) 302, a memory 303 and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 303 is non-transitory and can include random access memory (RAM), read only memory (ROM), disk drive, tape drive, etc., or a combination thereof. Embodiments of the present disclosure can be implemented as a routine 307 that is stored in memory 303 and executed by the CPU 302 to process the signal from the signal source 308. As such, the computer system 301 is a general-purpose computer system that becomes a specific purpose computer system when executing the routine 307 of the present disclosure.

The computer platform 301 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the methods described herein are programmed. Given the teachings of the present disclosure provided herein, one of ordinary skill in the related art will be able to contemplate these and similar implementations or configurations of embodiments described herein.

Having described embodiments for assessing an impact of security attacks on a system performance, it is noted that modifications and variations can be made by persons skilled in the art in light of the above teachings. It is therefore to be understood that changes may be made in embodiments of the present disclosure that are within the scope and spirit thereof.

What is claimed is:

1. A computer-implemented method for assessing an impact of a security attack on a software system, the method executed by the computer comprising the steps of:
    defining a system performance/reliability affecting metric for an observation period as a fraction of time the system satisfies a defined performance/reliability specification;
    defining a resource failure based Markov model and a plurality of resource usage based Markov models for the system, wherein each resource usage based model is associated with a corresponding resource configuration;
    using results of security test cases performed on said software system to obtain pass/fail results for each of a plurality of states of the resource failure based model and the resource usage based model for each corresponding resource configuration;
    solving the resource failure based Markov model and the plurality of resource usage based Markov models and obtaining a long term fraction of time each model spends on each of the plurality of states;
    and
    obtaining a measure of the system performance/reliability affecting metric by summing the states for a plurality of system performance requirements met using the pass/fail results obtained from the plurality of states of the resource failure based model and the resource usage based model for each corresponding resource configuration, and incorporating the long term fraction of time each model spends on each of the plurality of states.

2. The method of claim 1, wherein solving the Markov models for the resource failure model and the plurality of resource usage models includes conditioning each Markov model on an occurrence of a security attack on the software system.

3. The method of claim 1, wherein the resource usage based model monitors a number of resources being used in each resource configuration of the software system.

4. The method of claim 1, wherein the resource failure based model monitors a number of resources in the software system that fail due to a security attack.

5. The method of claim 1, wherein the system reliability metric measures performance as accuracy.

6. The method of claim 5, wherein accuracy includes determining a pass/fail criteria for each state of the resource usage models for a each defined failure configuration.

7. The method of claim 1, wherein the system reliability metric measures performance as efficiency.

8. The method of claim 7, wherein efficiency includes deriving the security test cases based on known security attacks, and updating the security test cases when new attacks are discovered.

9. A system for assessing an impact of a security attack on a software system, comprising:
    a processor configured to obtain a measure of a system performance/reliability affecting metric for an observation period as a fraction of time the system satisfies a defined performance/reliability specification by defining a resource failure based Markov chain and a plurality of resource usage based Markov chains for the system, wherein each resource usage based chain is associated with a corresponding resource configuration,
    using results of security test cases performed on said software system to obtaining pass/fail results for each of a plurality of states of the resource failure based Markov chain and the resource usage based Markov chain,
    solving the resource failure based Markov chain and the resource usage based Markov chain for each corresponding resource configuration and obtaining a long term fraction of time each Markov chain spends on each state,
    and
    obtaining a measure of the system affecting metric according to the state probability; and
    a memory configured to obtain a measure of the system performance/reliability affecting metric by summing the states for a plurality of system performance requirements met using the pass/fail results obtained from the plurality of states of the resource failure based model and the resource usage based model for each corresponding resource configuration, and incorporating the long term fraction of time each model spends on each of the plurality of states.

10. The system of claim 9, wherein solving the Markov chains for the resource failure model and the plurality of resource usage models includes conditioning each Markov chain on an occurrence of a security attack on the software system.

11. The system of claim 9, wherein resource usage based model monitors a number of resources being used in each resource configuration of the software system.

12. The system of claim 9, wherein the resource failure based model monitors a number of resources in the software system that fail due to a security attack.

13. The system of claim 9, wherein the system reliability metric measures performance as accuracy.

14. The system of claim 13, wherein accuracy includes determining a pass/fail criteria for each state of the resource usage models for a each defined failure configuration.

15. The system of claim 9, wherein the system reliability metric measures performance as efficiency.

16. The system of claim 15, wherein efficiency includes deriving the security test cases based on known security attacks, and updating the security test cases when new attacks are discovered.

17. A non-transitory computer readable medium storing instructions executable by a processor to performed method for assessing an impact of a security attack on a software system, the method comprising:
    defining a system performance/reliability affecting metric for an observation period as a fraction of time the system satisfies a defined performance/reliability specification;
    defining a resource failure based Markov model and a plurality of resource usage based Markov models for the system, wherein each resource usage based model is associated with a corresponding resource configuration;

using results of security test cases performed on said software system to obtain pass/fail results for each of a plurality of states of the resource failure based model and the resource usage based model for each corresponding resource configuration;

solving the resource failure based Markov model and the plurality of resource usage based Markov models and obtaining a long term fraction of time each model spends on each of the plurality of states; and obtaining a measure of the system performance/reliability affecting metric by summing the states for a plurality of system performance requirements met using the pass/fail results obtained from the plurality of states of the resource failure based model and the resource usage based model for each corresponding resource configuration, and incorporating the long term fraction of time each model spends on each of the plurality of states.

* * * * *